(No Model.)
J. M. SPENCER.
APPARATUS FOR WATERING STOCK.
No. 341,356. Patented May 4, 1886.
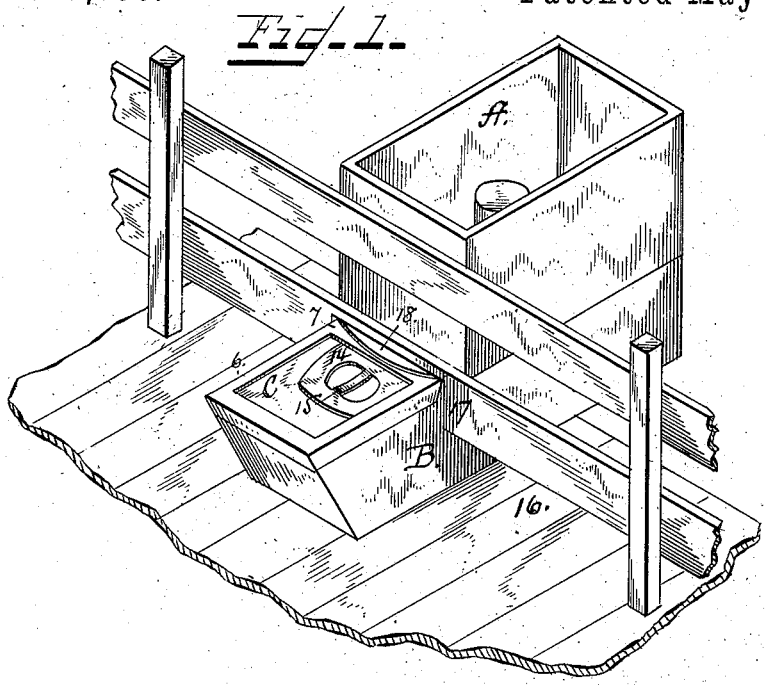
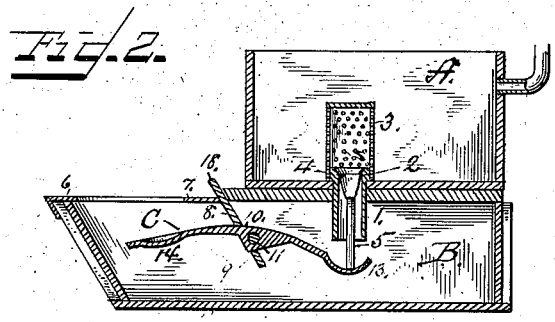
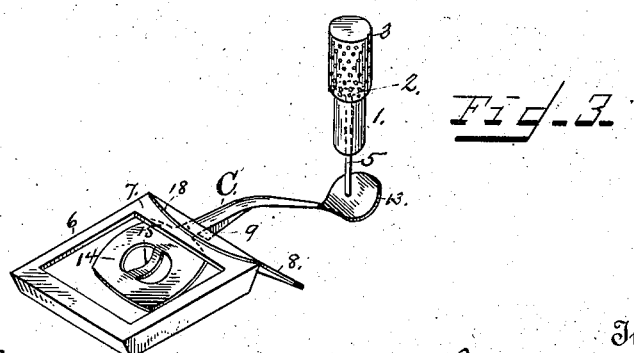
Witnesses
J. Thomson Cross
E. T. Pritchard
Inventor
John M. Spencer,
By his Attorney
A. G. Hughman

UNITED STATES PATENT OFFICE.

JOHN M. SPENCER, OF LAWRENCE, KANSAS, ASSIGNOR OF ONE-HALF TO E. L. HOUSE, OF SAME PLACE.

APPARATUS FOR WATERING STOCK.

SPECIFICATION forming part of Letters Patent No. 341,356, dated May 4, 1886.

Application filed February 26, 1886. Serial No. 193,299. (No model.)

*To all whom it may concern:*

Be it known that I, JOHN M. SPENCER, a citizen of the United States of America, residing in the city of Lawrence, in the county of Douglas, in the State of Kansas, have invented a new and useful Apparatus for Watering Stock, of which the following is a specification.

My invention has relation to improvements in troughs for watering stock, and has especial reference to troughs for watering hogs, of that character of troughs in which the supply of water from the main reservoir to the drinking trough or tank is controlled and regulated by a valve opened by a lever operated by the nose of the animal.

The object is to provide a drinking-place for animals which will supply clean water to them in sufficient quantity and at all times, and at the same time avoid waste of the liquid.

With these ends in view my invention consists in the novel construction and combination of parts, as will be hereinafter fully described, and specifically and certainly pointed out in the claims hereto made, as required by the statute.

I have fully and clearly illustrated my improved apparatus in the accompanying drawings, forming a part of this specification, and wherein—

Figure 1 is a perspective view of the apparatus in operative position, the sides of the reservoir and trough being broken away to show the mechanism. Fig. 2 is a central vertical sectional view; and Fig. 3 is a detail view of the metal frame, valve-lever, and valve.

In the drawings like parts are identified by like letters or numerals.

The letter A designates the reservoir. This may be of any suitable construction and of any desired capacity. A barrel may be substituted for a tank of rectangular construction, a water-pipe being let through the bottom of the barrel and the valve adjusted thereto, operating as well as other constructions of reservoir. The reservoir may be supplied with water by any convenient means, the supply being led thereto by a pipe from the pump or fountain-head. I have shown the reservoir as consisting of a box of rectangular build having a water-pipe let into it, through which the water is admitted. In the bottom of the reservoir is formed a hole, into which the water-escape pipe 1 is fitted. This pipe may be provided with exterior threads and screwed into the hole, or it may be adjusted therein and then packed about to prevent leakage. The upper end of the pipe 1 is formed with a cup, 2, which serves as a valve-seat, and to prevent any foreign substance from reaching the valve to interfere with the regular supply of water a screen, 3, is fitted over the pipe and valve, as shown in the drawings.

The reservoir is set on the trough and secured thereto by any suitable fastenings. A valve, 4, provided with a stem, 5, is fitted to the seat 2, and stops the flow of water when down in the seat, and permits it to escape when raised from its seat. The stem of the valve is of such length as to extend down into the trough and set on the step of the lever, as hereinafter stated.

The letter B designates the trough or drinking-tank, which consists of a box of any suitable shape or construction adapted to hold a quantity of water. The trough is covered over at that part which sets under the reservoir, and which projects outside of the pen or other inclosure. This covering is provided with a hole, through which the valve-pipe is projected, as shown in Fig. 2 of the drawings. A metal frame, 6, is secured over the edges of the open or drinking end of the trough, to serve as a guard to prevent the stock from gnawing the edges of the boards. This frame 6 is formed or provided with a cross-piece, 7, from which is projected or to which is secured a partition, 8, formed with a central slot, 9, and provided with bearings 10, in the former of which the valve-lever is disposed, and which rests in the bearings.

The letter C designates the valve-lever, swung on a pin, 11, in the bearings 10, and formed at the inner end with a step, 13, in which the foot of the valve-stem sets, substantially as shown in the drawings. On the other end of the lever is formed a nose-piece, 14, which has a cross-piece, 15, on either side of which are formed apertures. The nose-piece is made in dish shape, so that the nose of the animal shall naturally find the center of it when drinking. The inner arm of the valve-lever is the heavier, so that it shall drop by gravity when pressure is removed from the nose end, and let the valve drop down in its seat and stop the flow of water. The nose-piece is made of such size as to nearly cover the area of the open end of the trough, in order that the animal shall not be able to seriously disturb the mechanism by prying his nose about the edges of the plate of the nose-piece.

In order that cleanliness may be promoted and the apparatus preserved, it is essential that it be put on a substantial foundation. I have therefore illustrated the apparatus as set on a platform, 16, and held in position by having the siding of the inclosure let down over it, as shown at 17. A foundation is the more essential in instances where the inclosure has no floor, since the platform then keeps the parts adjacent to the trough in better condition.

The partition-piece 8, instead of being made as a part of the metal frame 6, may be made separate therefrom and set in channels in the sides of the trough, and thus be removable. The upper end of the partition-piece is extended, as seen at 18, and thus serves as one wall of a seat, between which and the end of the reservoir the wall of the inclosure is fixed, and the apparatus thus held down and in position.

The operation of my device or apparatus is essentially positive and automatic. The valve closes by gravity, but is raised by the act of the animal pressing on the nose-piece, under which pressure and during which the water is permitted to escape from the reservoir.

I am aware that watering-tanks having valves operated by floats have heretofore been made; but in my apparatus I dispense with floats or their equivalents, and substitute therefor a lever which is positive, and not automatic, in its action to lift the valve. I attain by this mechanism a valve-action which limits the supply to the animal according to his wants or capacity. I also keep the animal from all contact with the reservoir, which is maintained pure and clean.

What I claim as my invention, and desire to secure by Letters Patent, is—

1. In combination, the reservoir provided with a vertical escape-pipe having a valve-seat on its upper end, and a gravity-valve fitted to said seat, provided with a depending stem, a drinking-trough having the escape-pipe of the reservoir and the valve-stem depending therein, and a valve-lever fulcrumed in the drinking-trough, with its heavier and inner end terminating in a step to take the foot of the valve-stem, and the end of the outer arm formed with a nose-piece, substantially as described, and for the purpose stated.

2. In combination, a reservoir having a vertical escape-pipe provided with a gravity-valve having a depending valve-stem, a drinking-trough having communication with the reservoir-valve, and a valve-lever fulcrumed in the drinking-trough, with its heavier end to lift the valve, and its outer end formed with a nose-piece, through which the animal has access to the water, and whereby the valve is opened, substantially as described.

In witness whereof I have hereunto set my hand in the presence of two attesting witnesses.

JOHN M. SPENCER.

Witnesses:
O. M. BOND,
JAS. MYERS.